May 5, 1953     H. T. KRAFT     2,637,427
FLUID OPERATED COUPLING WITH DETACHABLE SHOES
Filed March 12, 1948     3 Sheets-Sheet 1
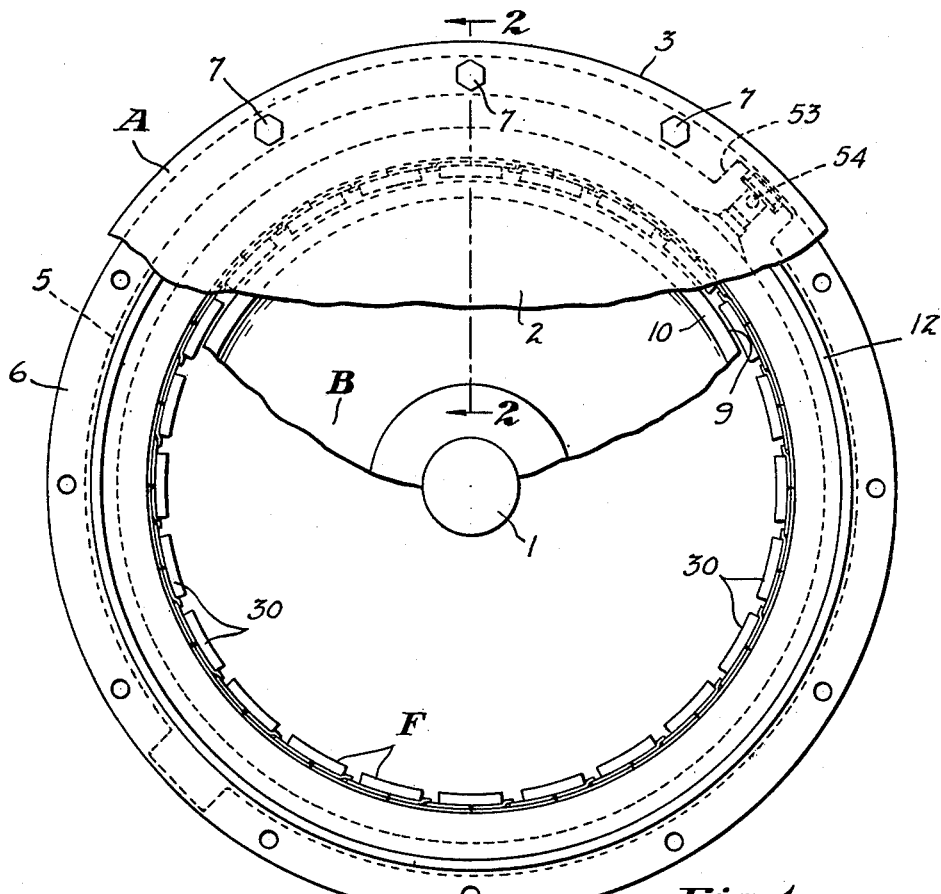
*Fig. 1*
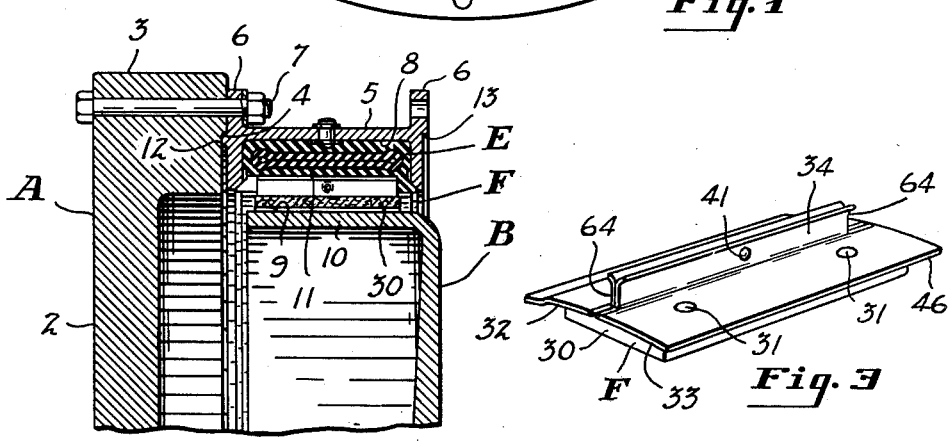
*Fig. 2*     *Fig. 3*
INVENTOR.
Herman T. Kraft
BY
Evans + McCoy
ATTORNEYS May 5, 1953           H. T. KRAFT           2,637,427
FLUID OPERATED COUPLING WITH DETACHABLE SHOES
Filed March 12, 1948           3 Sheets-Sheet 2
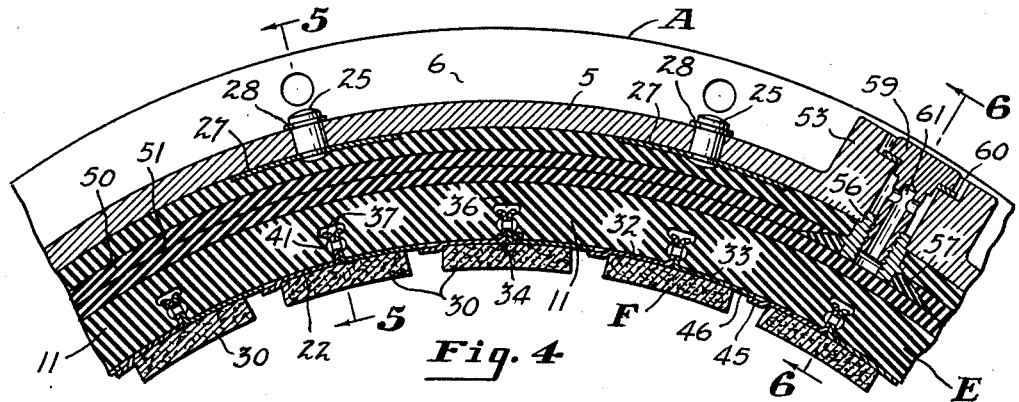
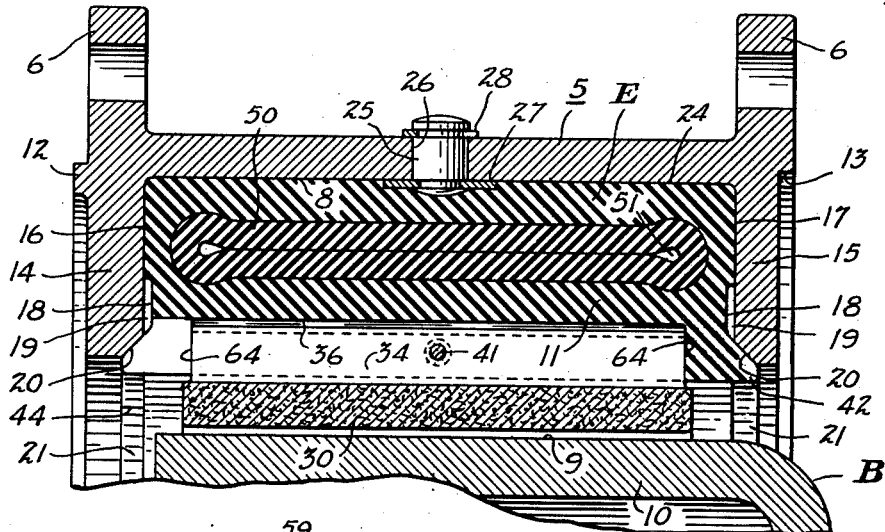
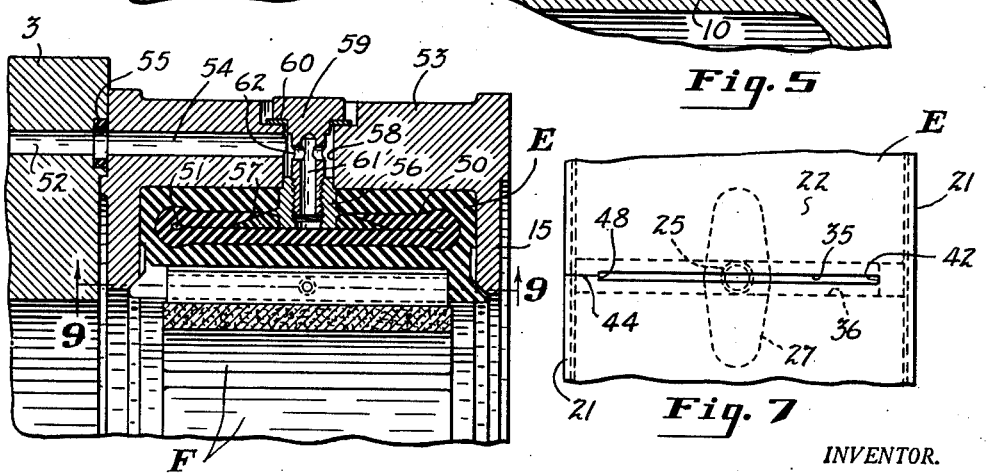
INVENTOR.
Herman T. Kraft
BY
Evans & McCoy
ATTORNEYS INVENTOR.
Herman T. Kraft
BY
Evans & McCoy
ATTORNEYS

Patented May 5, 1953

2,637,427

UNITED STATES PATENT OFFICE 2,637,427

FLUID OPERATED COUPLING WITH DETACHABLE SHOES

Herman T. Kraft, Akron, Ohio, assignor to The General Tire and Rubber Company, Akron, Ohio, a corporation of Ohio Application March 12, 1948, Serial No. 14,437

28 Claims. (Cl. 192—88)

This invention relates to torque transmitting devices, more particularly to such devices employing circumferentially extending, resilient, deformable elements that carry the torque load.

The principal objects of the present invention are: to provide a generally improved cushioning torque transmitting device suitable for use primarily as a clutch but also embodying principles and features of construction having applications in brakes and couplings; to provide such a torque transmitting device having a pneumatic element of deformable character that is movable to make or interrupt a driving connection between the parts of the device by the ingress or egress of a relatively small amount of fluid, more specifically to provide in combination a circumferentially extending resilient deformable annulus or rubber element incorporating a collapsed or flat sectional inflation chamber that is disposed relatively closer to the attaching face of the annulus than to the friction or pressure face thereof; to provide friction block assemblies for use in torque transmitting devices in combination with circumferentially extending resilient deformable rubber elements, the friction blocks and the elements being so interlocked as to be readily assembled or disassembled without damage or injury to the parts, each of the blocks being positively retained in predetermined relative position with respect to the deformable element carrying the same so as effectively to resist excessive twisting, turning and circumferential displacement of the block and the element; and to provide a torque transmitting device of the type having a series of friction blocks mounted about a resilient deformable rubber annulus which includes protective means for the annulus so arranged as to avoid interference with the free actuation of the device whereby the driving connection between the parts is made and interrupted positively, uniformly, and with the application of relatively small forces.

Another object of the invention is to provide a torque transmitting device employing a rubber annulus for carrying the torque load having improved means for maintaining a driving connection between the annulus and the member supporting the same.

A further object is to provide a friction torque device of the rubber annulus type having improved means for protecting the rubber annulus against burning particles resulting from establishing a frictional driving connection.

Still further objects and advantages of the invention relate to novel features of construction and arrangements of parts providing simplicity in design, economy in manufacture, and facilitating service and repair of the device, and replacement of worn and broken parts. Additional objects and advantages will become apparent from the following detailed description made in connection with the accompanying drawings forming a part of the present specification.

In the drawings:

Figure 1 is an end elevational view of a torque transmitting device partly in section and with parts broken away and removed;

Fig. 2 is a sectional detail taken substantially on the line 2—2 of Fig. 1;

Fig. 3 is a perspective view of one of the friction block assemblies;

Fig. 4 is a fragmentary sectional view through the outer rotatable member of the device, parts being broken away and removed, this view being taken in a plane transverse to the rotational axis of the device, the parts being enlarged with respect to Fig. 1;

Fig. 5 is a radial sectional detail through the outer rotatable member, with parts removed, this view being taken substantially along the line indicated at 5—5 of Fig. 4 and enlarged with respect to that figure;

Fig. 6 is a radial sectional detail, with parts broken away and removed, taken substantially along the line indicated at 6—6 of Fig. 4, this view showing the construction of the pneumatic inflating assembly;

Fig. 7 is a fragmentary elevational detail showing a portion of the pressure face of the rubber annulus, friction blocks removed;

Figure 8:
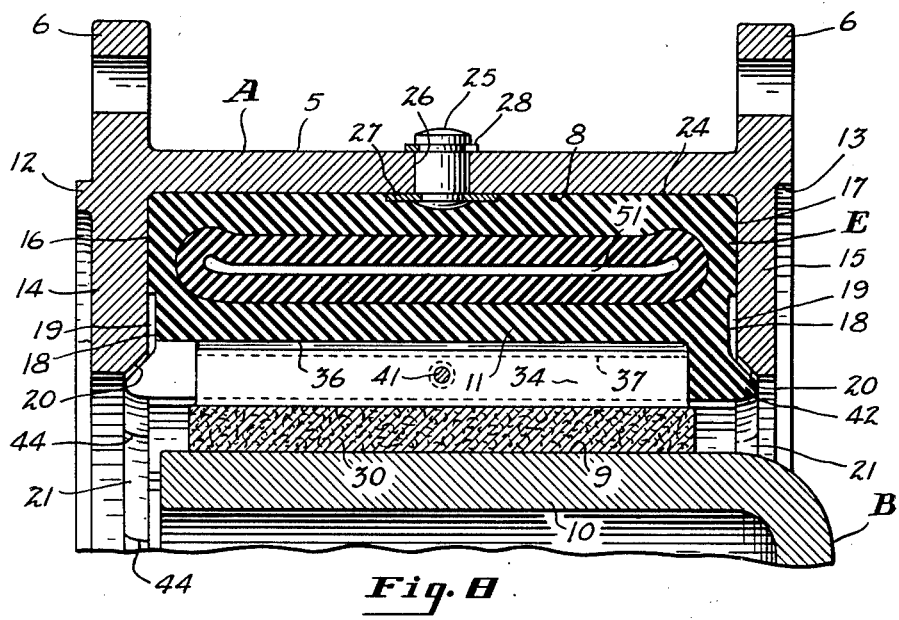
Fig. 8 is a radial sectional view with parts broken away and removed like Fig. 5 but showing the rubber annulus distended by internal pressure to establish a driving connection between the parts.
Figure 9:
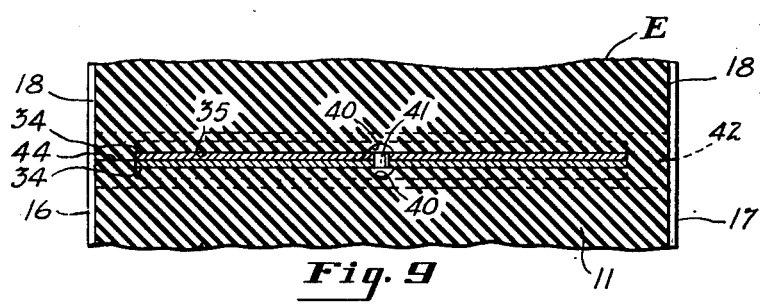
Fig. 9 is a fragmentary sectional detail taken substantially on the line indicated at 9—9 of Fig. 6 to show one of the transverse slots or grooves provided in the rubber annulus for receiving and retaining in interlocking relation the flange of one of the friction blocks.
Figure 10:
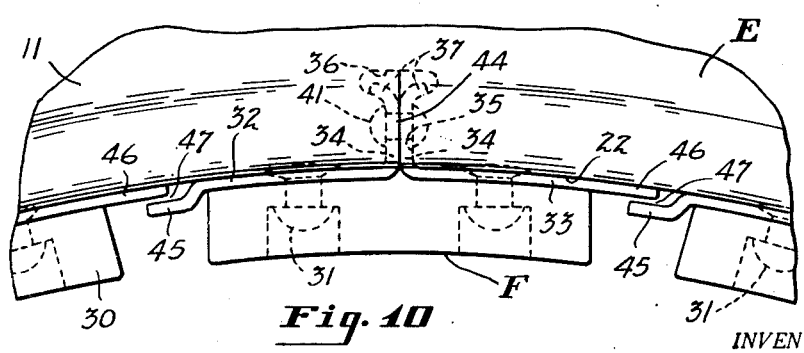
Fig. 10 is an enlarged fragmentary elevational detail with parts broken away and removed, showing the interlocking connection between the deformable rubber annulus and one of the individual friction block assemblies which holds the parts in assembled relation.

The principles of the present invention are embodied in a torque transmitting device intended for use as a driving clutch which couples a pair of axially aligned shafts. The present clutch has such flexibility as to permit substantial misalignment of the shafts both laterally and angularly.

Axial shifting of the shafts is also permitted to a limited extent, severe axial displacement of one of the shafts with respect to the other being strongly resisted. Similar types of torque transmitting devices have previously been proposed, such designs being shown in my prior Patents No. 2,246,978 issued June 24, 1941, No. 2,252,128 issued August 12, 1941, No. 2,246,979 issued June 24, 1941, and No. 2,326,300 issued August 10, 1943.

Particular reference is made to copending application Serial No. 769,059 filed August 16, 1946, on Torque Transmitting Device which discloses common subject matter. In the earlier disclosures are shown structural elements such as supporting shafts, drums, discs and fluid supply means utilized in a complete torque transmitting assembly such as a brake or clutch. The present invention is concerned with the friction means for establishing the driving connection between the rotatable members of the coupling or clutch and the resilient annulus or mounting therefor.

The present disclosure is therefore restricted to those features necessary or convenient to a complete understanding of the principles of the instant invention, it being understood that the mounting shafts to be coupled by the present device, the supports and journals for such shafts as well as the valves, conduits and glands for supplying the pneumatic fluid for actuating the device may be conventional or of the type shown in the prior disclosures referred to.

The clutch comprises an outer rotatable member indicated generally by the letter A and an inner rotatable member indicated generally by the letter B. Either member may be the driving member and either member may be the driven member depending on the particular application of the device. The members are mounted on axially aligned shafts, one of which is indicated at 1, Fig. 1.

The outer member A comprises a circular cast or forged metal disc 2 which may be of relatively heavy section to serve as a fly wheel, the disc having a thickened peripheral rim 3. Mounted against one face of the disc rim 3 and interfitting with locating shoulder 4 thereof is a circular drum 5, also of metal, which is of H section and has outwardly directed radial flanges 6 one of which is disposed flatwise against the disc rim 3 and is secured thereto by through bolts 7. The outer drum 5 is formed with an inwardly directed circular channel that confronts the inner rotatable member B and has a cylindrical face 8 which surrounds and is disposed in spaced relation to an outwardly directed cylindrical friction face 9 formed on cast or forged metal drum portion 10 of the inner rotatable member B. Interposed in the annular space between the inwardly directed face 8 on the outer rotatable member and the outwardly directed friction face 9 of the inner rotatable member is a circumferentially extending resilient deformable element E mounting a series of friction block assemblies F.

The element E is preferably completely annular in extent and is included in a pneumatic assembly which can be inflated to move the friction blocks F into engagement with the friction face 9 of the inner rotatable member so as to establish driving connection between the parts.

The annulus or element E is of molded rubber composition having a stiffness corresponding to that used in conventional tires for passenger automobiles. Body portion 11 is of solid rubber and is of relatively greater axial width than radial thickness.

One end face of the drum 5 is formed with an integral circular rib 12 which fits within the shoulder 4 of the disc rim 3 to locate the drum in precise axial alignment with the disc. The other end face of the drum is formed with an offset portion providing a circular shoulder 13 which has a diameter matching the outer edge of the rib 12. Thus a plurality of the drums 5 can be positioned in side by side arrangement and matched to an equal number of the inner members B on a common shaft to provide a torque transmitting device of any desired capacity. In arranging the drums in multiple, the ribs 12 interfit with the shoulders 13 to locate the drums in concentric relation to one another and the adjacent flanges 6 are connected together by through bolts.

The circular drum 5 of the outer rotatable member is substantially of H shape in section and has integral flanges 14 and 15 which are disposed in spaced parallel relation and are directed radially inwardly from the inner face 8 toward the face 9 of the other or inner rotatable member. The rubber annulus E is received snugly between confronting walls of the circular flanges 14 and 15, the fricitonal grip of side walls 16 and 17 of the annulus on the metal flanges normally being sufficient to retain the annulus in place during assembly and transit.

Inner marginal portions 18 of the annulus side walls 16 and 17 are relieved or offset inwardly, providing circumferential clearances 19 between the annulus and the drum flanges 14 and 15 which extend around substantially the entire extent of the annulus. The clearances 19 permit slight axial displacement or deformation of the annulus E in use, extreme or severe displacement being limited by engagement between one of the drum flanges 14 or 15 and the corresponding relieved side wall portion 18.

Thus, the body portion 11 of the resilient deformable element is free for limited displacement or movement axially, circumferentially, and radially, subject to the internal resistance of the same to deformation and subject also to the physical limitations against excessive axial displacement afforded by the radially inwardly projecting flanges 14 and 15 disposed to support the side walls of the rubber element E upon severe axial loading to limit the axial movement of the latter.

Along the inner edges of the drum flanges 14 and 15 the edge corners of such flanges are beveled as indicated at 20 to accommodate overhanging or axially directed circular flanges 21 formed along the sides of the annulus E. The flanges 21 are tapered in section and are disposed at the inner or pressure face 22 of the annulus so as to extend the pressure face beyond the annulus side and beyond the clearances 19. These annular clearances are continuous between the drum flanges 14 and 15 and the axial extension flanges 21 of the annulus to permit limited axial displacement of one rotatable member with respect to the other. Each of the clearances 19 thus opens along the edge of one of the flanges 21 at an oblique angle to the rotational axis of the device, the opening being partially shielded by the overhanging annulus flanges 21. Hot particles resulting from frictional engagement between the friction block assemblies of the device and the face 9 of the inner rotatable member are thus deflected axially away from the clearance openings by the overhanging shape of the annulus.

Outer face 24 of the annulus E is of cylindrical form and seats against inner face 8 of the drum 5, the annulus being supported throughout substantially its entire circumferential extent by the drum. To resist shifting of the annulus with respect to the outer drum, a plurality of circumferentially spaced radial shear pins 25 are secured to the annulus E and are received in openings 26 in the drum 5. The shear pins are individually secured to localized areas of the annulus face 24 as by means of plates 27 of brass or other suitable metal, the brass plates being generally oval in plan form and bonded into shallow recesses in the face of the annulus. Each of the plates 27 is centrally apertured to receive a reduced diameter end of the shear pin associated therewith, the shear pin being riveted over on the underside of the plate. Locking or split collars 28 received in annular grooves or channels formed adjacent the outer ends of the shear pins 25 engage against the outer face of the rotatable drum 5 to retain the shear pins in the apertures 26, thereby preventing withdrawal of the annulus E from the drum channel.

One method of attaching the shear pins and plates 27 to the annulus is to mount them as inserts in the forming mold in which the annulus is vulcanized. During the curing of the annulus the rubber thereof bonds to the brass plates 27.

Each of the friction block assemblies F includes a wear resistant contact or body member 30 which is preferably of molded composition corresponding to that used in conventional brakes of automotive vehicles. This body portion is of rectangular shape and is secured by rivets 31 to a pair of metal mounting plates 32 and 33. These plates are of tough rolled metal such as steel and have right angle flange portions 34 disposed in back to back relation and spot-welded together. The flange portions 34 of the mounting plates constitute an attaching flange which is received in a transverse slot or groove 35 molded as by a core piece or otherwise formed in the body portion 11 of the rubber annulus or element E. The main portions of the mounting plates are disposed flatwise against inner pressure face 22 of the rubber annulus. Although the face of the annulus as shown is wider than the mounting plates and extends axially beyond the edges of such plates, the plates may be made the full width of or wider than the annulus. The bottom of each of the grooves 35 is enlarged along the length of the groove, providing undercut recesses 36 which receive oppositely bent or rolled edges 37 formed on the plate flanges 34. The molding of the transverse grooves 35 is effected by mold parts or core pieces thinner than the retaining flanges of the friction blocks F so that such retaining flanges are embraced or gripped between the confronting walls of the rubber channels 35. The undercut recesses 36 along the bottoms of the transverse grooves are larger than the rolled over edges 37 of the plate flanges to permit slight working or movement without chafing or cutting of the rubber at the flange edges.

In the central portion of each of the transverse grooves 35 the walls of the latter are formed with hemispherical recesses 40 that receive the rounded ends of a rivet detent 41 secured through the plate flanges 34. The seating of the ends of the rivets 41 in the recesses 40 locate the friction blocks by detent and socket action in correct relative positions transversely of the deformable annulus E. During assembly each of the friction blocks F, previously assembled as a unit, is slid axially into position, the retaining flanges of the plates 32 and 33 moving axially into the grooves 35 until the flange rivets or detents 41 register with and are received in the groove recesses 40. During this assembly operation the walls of the grooves 35 are locally deformed by the movement of the rivets 41, this slight deformation not being injurious. Closed groove ends or connecting lands 42 also serve to locate the blocks by engagement with the ends of the flanges 34 in assembly, as will appear.

The edges of the mounting plates 32 and 33 extend circumferentially beyond the body portions 30 of the friction blocks and across the spaces intervening between adjacent blocks. Each plate 32 has an offset flange portion 45 which is spaced from the pressure face of the annulus and overlaps an edge portion 46 of the plate 33 of the adjacent friction block unit. The offset of the flange portion 45 is greater than the thickness of the metal out of which the mounting plates are formed so as to provide a clearance 47 between the flange and the companion plate edge portion 46. This clearance between the overlapped edges of the mounting plates is extremely advantageous for the reason that it permits relative circumferential movement of the adjacent friction blocks toward and away from one another during engagement and disengagement of the clutch.

The composition body portions 30 of adjacent friction block assemblies are spaced from one another and during the starting engagement of a clutch of the type herein disclosed, hot particles are apt to move into such spaces between the friction blocks. The overlapped portions 45 and 46 of the mounting plates serve as protection for the rubber element or annulus E against such hot particles and other foreign matter that might otherwise come in contact with the rubber body 11.

Although the flange receiving slots 35 may open through both side walls of the annulus E they preferably open through only one of the side walls, such as the side wall 16, the slots being closed by lands 42 which are part of or integral with the circumferential flange 21 along the side wall 17. The lands 42 act as stops against which the ends of the plate flanges 34 are abutted in assembly, thus serving to locate the block assemblies in predetermined positions on the pressure face 22 of the annulus E. The connecting lands 42 preferably extend throughout the entire depth of the flange receiving slots 35, as shown, although the bottoms or undercut portions 36 of the slots may, if desired open through the annulus wall. In molding the annulus E the slots or grooves 35 are formed as by inserts or cores having the same length as the block flanges 34 so as to provide the integral lands 42 along the annulus wall 17. Similar lands are also formed along the annulus wall 16 and are later cut through, as by a knife, providing slits 44 the walls of which are normally together, closing the slits. In assembly, the slit walls are spread apart to pass the block flanges. Shoulders 48 (Fig. 7) at the slitted ends of the slots engage the ends of the block flanges to locate and retain the blocks on the annulus.

In the normal unstressed position of the resilient deformable annulus or element E, the friction block assemblies F are held in retracted position out of engagement with friction surface 9 of the inner rotatable member B (Figs. 1, 2, 5 and 6). To establish a driving connection between the rotatable members A and B, fluid, such as air, is introduced into the pneumatic device to deform the resilient annulus E in such manner as to move the friction blocks F against the surface 9. The air or other suitable pneumatic fluid to effect inflation, supplied from a suitable source, not shown, is conducted (as through an axial bore in the shaft mounting the outer rotatable member) into a radial passage in the disc 2 which communicates at the periphery of the outer rotatable member with an axial branch 52 (Fig. 6) in the rim 3. The drum 5 has an integral thickened portion or cross member 53 extending across its outside face between the attaching flanges 6. A passage or bore 54 in the thickened member 53 is aligned with the rim passage 52 to receive air from the latter, a seal being effected as by means of a gasket or packing 55 in a recess in one of the confronting faces. An internally threaded ferrule or stem 56, having a rubber base 57 bonded thereto, is embedded in the annulus E, one face of the ferrule base 57 being disposed substantially flush with the inner surface of the inflation chamber 51. The inflation ferrule is built into the annulus E prior to vulcanization of the latter so that during curing the base 47 is bonded to the reinforcing cord material 50.

An outer reduced diameter portion of the ferrule 56 extends beyond the plane of the outer face 24 of the annulus and is received in the registering opening of a radial passage 58 formed in the drum cross member 53. A headed tubular element 59 is externally threaded on one end to be threadedly received within the ferrule 56. The head of the element 59 closes the other end thereof and is received in an enlarged end of the radial passage 58 against a sealing washer 60 of soft metal. Internal passage 61 of the tubular element 59 communicates through radial drill holes 62 in such element with the interior of the passage 58, the latter being continuous with the passage 54 which receives the inflating air or fluid from the pressure source. In this manner inflating air or fluid can be introduced into the annulus chamber 51 during rotation of the torque transmitting device to deform the annulus as by contracting the same about the inner drum substantially to the position or shape illustrated in Fig. 8 wherein the friction block assemblies F are in engagement with the outwardly directed face 9 of the inner rotatable member B.

The contraction of the inflatable annulus distends the side walls and the force applied by the annulus against the friction blocks causes an outward swelling of the protective flanges 21 in an axial direction so that the latter more effectively shield the openings into the clearances 19 and prevent the entrance of hot particles from the friction blocks entering such clearance spaces. The integral lands 42 and the closed slits 44 at the ends of the flange retaining slots 35 serve to prevent the entrance of hot particles or other foreign material into the slots and the clearance spaces along the sides of the annulus.

The ends of the block retaining flanges 34 are relieved or cut away as indicated at 64 so that the flanges are of shorter or of less axial extent than the block plates 32 and 33. Thus, while the plates 32 and 33 extend over substantially the entire area of the annulus pressure face 22 to protect the latter and to receive the pressure of the latter in effecting and maintaining frictional engagement between the coupling parts, the attaching flanges 34 terminate inwardly of the side walls of the inflatable annulus so that interference with the movement of the annulus during inflation and deflation of the latter is avoided. Such relief of the end portions of the attaching flanges 34 facilitates the engaging and disengaging of the frictional drive connection between the parts since the side portions of the annulus are free to move without restraint. Wear and chafing at the ends of the attaching flanges 34 are reduced. While the extent of the cut back or shortening of the attaching flanges 34 may vary, a satisfactory construction is that in which the axial length of the flanges is approximately equal to the width or axial extent of the inflation chamber 51. In such an arrangement the rigid plates of the friction block assemblies, interlocked with the rubber of the inflatable annulus as by the rolled edges 37 of the attaching flanges, control the contraction or deformation of the annulus so that the latter moves uniformly and evenly during inflation, the deformation of the rubber being confined largely to the side marginal portions thereof.

To press the friction block assemblies F into engagement with the inner drum face 9 the resilient annulus E is contracted or deformed uniformly by suitable means such as air or other fluid introduced into the interior of the annulus under pressure. In the particular construction used in the device of the present invention a number of plies of rubber covered cord reinforcing material, indicated at 50, are used to form or surround a radially flattened inflation cavity 51 normally of little or minimum volume. This cavity, extending circumferentially throughout the annulus, is located relatively close to the outer face 24, the bulk or principal mass of the annulus being disposed between the plane of the inflation cavity and the pressure face 22.

The cords are arranged in parallel relation to one another and to the rotational axis of the device. Thus the cords may be said to be axially disposed. In building up the annulus, plies of sheeted rubber containing the cords are wrapped about one another to form the inflation cavity. The ply material is such as that employed in the manufacture of pneumatic vehicle tires, the building up of the annulus being done with the cord ply material and rubber in uncured or partially cured condition. To prevent the interior walls of the cavity from adhering to one another during the subsequent curing or vulcanization of the annulus, a suitable anti-adhesion agent such as waxed paper or soapstone is applied to the interior or confronting surfaces of the ply material which form the walls of the inflation cavity.

Although the chamber 51 normally is of little or no radial depth it extends across substantially the entire width of the annulus so that upon the introduction of inflating fluid into the same the annulus is contracted inwardly across substantially its entire width. In its collapsed or normal condition (Fig. 5) the plane of the inflation chamber 50 is within those areas or zones of the annulus side walls 16 and 17 that are abutted against and in frictional engagement with the confronting side walls of the drum flanges 14 and 15. The side clearances 19 terminate short of the plane of the inflation cavity. Thus the drum flanges resist axial distention of the annulus in the plane of the inflation chamber and substantially the entire inflation imparted to the annulus is effective in producing inward contraction or clutch engaging deformation of the annulus.

During driving operation or running of the device the fluid pressure within the pneumatic annulus holds or forces the friction blocks F strongly against the cylindrical face 9 of the inner rotatable member. A corresponding radial force acts between the flat faces of the mounting plates 32 and 33 of the friction blocks and the pressure face 22 of the rubber element E which underlies the mounting plates. Torque is thus transmitted to a very great degree by frictional engagement between the mounting plates 32 and 33 and the friction or pressure face 22 of the resilient deformable annulus. The interlocking connections between the individual friction blocks and the rubber annulus E, afforded by the attaching flanges of the blocks that are received in the grooves 35, serve to transmit some of the driving torque, especially during engaging and disengaging operations; they also resist twisting and turning as well as circumferential displacement of the friction blocks on the annulus.

Should the friction blocks become worn or damaged so that it is desirable to replace one or more, they can be readily removed by withdrawing them axially from assembled relation in the annulus E. The shear pins 25 are released from the holding rings 28 in the region of the block or blocks to be replaced so that the annulus can be pried out of the confining channel to let the block flanges 34 clear the drum flanges 14 during removal and replacement of the blocks. Replacement of the friction blocks F is thus effected without injury or damage to either the annulus E or the blocks and without the use of special tools or equipment. The blocks F are individually removed using only enough force to overcome the restraint of the ends of the rivet 41 in the rubber sockets or recesses 46 and the slight frictional grip of the groove walls 35 on the opposite side faces of the block retaining flanges.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. In a torque transmitting device, a friction block comprising a body element having a thin depending flange, and, in combination therewith, a resilient deformable rubber member for mounting the block, said rubber member being formed with a narrow groove to receive the flange with the latter tightly embraced by the rubber member to retain the block in predetermined position relative to the rubber member and to resist twisting of the block on the member; and interfitting formations on the flange and within the groove on the rubber member to resist longitudinal displacement of the flange in the groove, said formations being located intermediate the ends of the flange.

2. In a torque transmitting device, a friction block comprising a body element having a thin depending flange, and, in combination therewith, a resilient deformable rubber member for mounting the block, said rubber member being formed with a narrow groove to receive the flange with the latter tightly embraced by the rubber member to retain the block in predetermined position relative to the rubber member and to resist twisting of the block on the member, the groove being undercut and the flange having a lateral extension disposed in the groove undercut to provide a mechanical interlock resistant to withdrawal of the flange from the groove in one direction while permitting longitudinal sliding of the flange in the groove in another direction in assembly, and interfitting formations on the flange of the body element and within the groove of the rubber member to provide another mechanical interlock resistant to sliding of the flange in the groove to locate the flange in predetermined position relative to the rubber member and effective to prevent displacement of the flange in normal use.

3. In a torque transmitting device, a friction block comprising a body element having a thin depending flange, and, in combination therewith, a resilient deformable rubber member for mounting the block, said rubber member being formed with a narrow groove to receive the flange with the latter tightly embraced by the rubber member to retain the block in predetermined position relative to the rubber member and to resist twisting of the block on the member, the groove being undercut and the flange having a lateral extension disposed in the groove undercut to provide a mechanical interlock resistant to withdrawal of the flange from the groove in one direction, while permitting longitudinal sliding of the flange in the groove in another direction in assembly, a laterally protruding detent on the flange, and a recess in the groove wall to receive the detent and provide another mechanical interlock which locates the flange in predetermined position relative to the groove, the detent being movable longitudinally of the groove in assembly by slight deformation of the walls of the groove, said other mechanical interlock being sufficient to resist longitudinal displacement of the flange from said predetermined position in normal use.

4. In a torque transmitting device of the type having relatively rotatable members one of which carries a resilient deformable rubber element, a series of friction block assemblies mounted on the resilient deformable member, each of said assemblies comprising a pair of flanged metal plates having the flanges disposed in back to back relation providing a composite attachment flange, the attachment flanges of the several friction block assemblies being received in transverse, generally parallel grooves formed in the resilient deformable member, and elements of wear-resisting material attached to the pairs of flanged metal plates.

5. In a torque transmitting device of the type having relatively rotatable members one of which carries a resilient deformable rubber element, a series of friction block assemblies mounted on the resilient deformable member, each of said assemblies comprising a pair of flanged metal plates having the flanges disposed in back to back relation providing a composite attachment flange, the attachment flanges of the several friction block assemblies being received in transverse, generally parallel grooves formed in the resilient deformable member, and elements of wear-resisting material attached to the pairs of flanged metal plates, edge portions of the metal plates of adjacent block assemblies being overlapped providing a substantially continuous metal sheath over the deformable rubber element.

6. In a torque transmitting device of the type having relatively rotatable members one of which carries a resilient deformable rubber element, a series of friction block assemblies mounted on the resilient deformable member, each of said assemblies comprising a pair of flanged metal plates having the flanges disposed in back to back relation providing a composite attachment flange, the attachment flanges of the several friction block assemblies being received in transverse, generally parallel grooves formed in the resilient deformable member, and elements of wear-resisting material attached to the pairs of flanged metal plates, edge portions of the metal plates of adjacent block assemblies being disposed in overlapped relationship to provide a continuous metal sheath over the deformable rubber element, the overlying edge portions being offset from the plane of the metal plate on which they are formed to permit retention of the other portions of the plates in a substantially common plane.

7. In a torque transmitting device of the type including relatively rotatable members one of which carries a resilient deformable rubber element having a pressure face and that is expansible and contractible in making and interrupting driving connection between the members, a series of friction block assemblies mounted about the pressure face of the rubber element, said assemblies moving relatively toward and away from one another during expansion and contraction of the element, each of said assemblies, comprising a metal plate disposed flatwise against the rubber of the pressure face, and offset flanges on the plates extending protectively over areas of the rubber element and overlapping marginal portions of adjacent metal plates, the plates and flanges being so formed as to provide clearances between the overlapped parts of adjacent assemblies to avoid restraining frictional forces during expansion and contraction of the rubber element whereby uniform, positive, and rapid making and interrupting of the driving connection is effected.

8. In a torque transmitting device, a friction block assembly including a metal attaching plate having an angularly disposed retaining flange in combination with a fluid deformable rubber mounting member, said member having a transversely grooved pressure face, the plate being disposed flatwise against the pressure face of the rubber member with the flange disposed in a groove of the mounting member, and formations along the length of the flange for interfitting with the mounting member to resist lateral withdrawal of the flange from the groove, said formations being of less extent along the length of the flange than the extent of the attaching plate in the same direction providing projecting plate portions having limited freedom of movement toward and away from the pressure face of the mounting member upon fluid deformation of the latter.

9. In a torque transmitting device of the type having relatively rotatable members, one of which is formed with an annular channel directed toward the other, said annular channel having spaced generally confronting side walls, a rubber annulus disposed in the channel for establishing a driving connection between the members, the annulus and the one member being formed to provide a clearance space between the annulus and one of the channel side walls, said annulus having an integral axially extending flange disposed in overlying relation to said one channel wall to deflect particles of dirt and the like away from the clearance space.

10. In a torque transmitting device of the type having relatively rotatable members, one of which is formed with an annular channel directed toward the other, an inflatable rubber annulus disposed in the channel for establishing a driving connection between the members, the annulus and the channeled member having axially spaced confronting side walls providing a circumferentially extending clearance and substantially annular means on the annulus extending axially outwardly over and beyond the clearance, said annular means being joined to said annulus adjacent one of said side walls thereof for axially outward movement therewith when said annulus is inflated.

11. In a torque transmitting device of the type having relatively rotatable members one of which is formed with an annular channel directed toward the other, the channel having spaced generally confronting side walls, a rubber annulus disposed in the channel for establishing a driving connection between the members, the annulus and the one member being formed to provide annular clearance spaces between the annulus and the channel side walls, said annulus having integral axially extending flanges disposed in overlying relation to the clearance spaces and the channel walls.

12. In a torque transmitting device of the type having relatively rotatable members, one of said rotatable members being formed with an annular channel having a bottom and spaced, generally confronting side walls, a rubber annulus disposed in the channel for establishing a driving connection between the rotatable members, the annulus having a circular pressure face in confronting relation to the other of said rotatable members, the annulus also having a base disposed against the bottom of the channel and side walls disposed in confronting relation to side walls of the channel, and substantially annular integral rubber flange means on the annulus adjacent the pressure face thereof extending axially beyond and in overlying relation to the said side walls of the channeled member.

13. In a torque transmitting device of the type having relatively rotatable members one of which is formed with an annular channel directed toward the other, a rubber annulus disposed in the channel for establishing a driving connection between the members, friction block assemblies mounted on the annulus for engagement with the other rotatable member, the annulus and the channeled member having confronting side walls disposed in axially spaced relation to provide a circumferentially extending clearance space, and an integral circumferential flange on the annulus extending axially in overlying relation with respect to the clearance space to deflect particles abraded from the friction blocks away from the clearance space.

14. In a torque transmitting device of the type having relatively rotatable members one of which is formed with an annular channel directed toward the other, an inflatable rubber annulus disposed in the channel for establishing a driving connection between the members, the annulus and the one member having axially spaced confronting side walls providing circumferential clearance spaces between the annulus and said one member, and annular means substantially continuous and uninterrupted about substantially the entire circumferential extent of the annulus extending axially outwardly over the circumferential clearances to deflect foreign particles and prevent such particles from entering the clearance spaces, said annular means being joined to said annulus adjacent one of said side walls thereof for axially outward movement therewith when said annulus is inflated.

15. In a torque transmitting device of the type having relatively rotatable members, one of which is formed with an annular channel directed toward the other, an inflatable rubber annulus disposed in the channel for establishing a driving connection between the members, the annulus and the one member having axially spaced confronting side walls providing circumferential clearance spaces between the annulus and said one member on both sides thereof, and a pair of annular means on the annulus extending substantially continuously and uninterruptedly about substantially the entire circumferential extent of the annulus and extending axially outwardly in opposite directions beyond the side walls of the annulus and over the circumferential clearances to deflect foreign particles and prevent such particles from entering the clearance spaces, said pair of annular means being respectively joined to said annulus adjacent said side walls thereof for axially outward movement therewith in opposite directions when said annulus is inflated.

16. In a torque transmitting device of the type having relatively rotatable members, one of which is formed with an annular channel directed toward the other, a rubber annulus disposed in the channel for establishing a driving connection between the members, the annulus having a circular pressure face in confronting relation to said other member, the annulus also having a base disposed against the bottom of the channel and side walls disposed in confronting relation to side walls of the channel, a plurality of friction blocks and means mounting such blocks on the pressure face of the annulus, and substantially annular means on the annulus adjacent the pressure face thereof extending axially beyond and in overlying relation to the said side walls of the channeled member, said axially extending means being intermediate the friction blocks and the side walls of the annulus and of the channel to intercept and deflect hot particles and the like abraded from the blocks during operation of the device.

17. In a torque transmitting device, a friction block assembly comprising a metal plate having a depending flange in combination with a resilient deformable rubber member for mounting the block assembly, said rubber member having spaced side faces and an arcuate pressure face and being formed with a transverse groove across said arcuate face to receive the depending flange of the block assembly for retaining such assembly in predetermined relation to the rubber member with the metal plate of the assembly seated substantially flatwise against the arcuate face of the rubber member, the transverse groove having an opening at one end through one of the side faces of the rubber member for endwise insertion and withdrawal of the block assembly flange.

18. In a torque transmitting device, a friction block assembly comprising a metal plate having a depending flange in combination with a resilient deformable rubber member for mounting the block assembly, said rubber member having spaced side faces and an arcuate pressure face and being formed with a transverse groove across said arcuate face to receive the depending flange of the block assembly for retaining such assembly in predetermined relation to the rubber member with the metal plate of the assembly seated substantially flatwise against the arcuate face of the rubber member, the transverse groove opening at one end through one of the side faces of the rubber member for endwise insertion and withdrawal of the block assembly flange, and interfitting formations on the block assembly and the rubber member yieldingly to resist endwise movement of the block assembly flange in the groove.

19. In a torque transmitting device of the type having relatively rotatable structures, one of which includes a resilient deformable member having spaced side faces and an arcuate pressure face and a plurality of friction block assemblies mounted on such member, improved attaching means for the block assemblies comprising transverse undercut grooves in the deformable member paralleling the rotational axis of the device, each block assembly having a flange interlockingly received in one of the grooves, the deformable member being formed with integral shoulder means at the ends of the grooves engageable with the ends of the block assembly flanges to locate such assemblies on the deformable member, and slits in the deformable member between the shoulder means at one end of each groove and the adjacent side face of the deformable member for endwise movement of the block assembly flanges through the slits in mounting the block assemblies.

20. In a torque transmitting device of the type having relatively rotatable structures, one of said rotatable structures including a resilient deformable member having spaced side faces and an arcuate pressure face confronting a friction surface on the other rotatable structure, a plurality of friction block assemblies mounted on the deformable member, each block assembly including a body member disposed flatwise against the pressure face of the deformable member and providing a friction surface for engaging the other rotatable structure, each block assembly also including a flange embedded in the deformable member and gripped thereby to resist separation, the flanges being transverse to the deformable member and substantially shorter than the axial width of that portion of the deformable member in which it is embedded, and the deformable member substantially enclosing the ends as well as the sides of said flanges for restraining relative axial movement thereof, and the body members of the block assemblies being substantially longer than said flanges to provide friction surfaces of greater axial extent than said flanges while permitting radial separation of portions of the pressure face of the deformable member from overlying marginal portions of the block body members beyond the flange ends upon distortion of the deformable member without interference from said flanges of the block assemblies.

21. In a torque transmitting device of the type having relatively rotatable structures, one of said rotatable structures including a resilient deformable member having spaced side faces and an arcuate pressure face, a plurality of friction block assemblies mounted on the deformable member, each block assembly including a body member disposed flatwise against the pressure face of the deformable member and providing a friction surface for engaging the other rotatable structure, transverse undercut grooves in the deformable member and opening through the pressure face thereof, flanges on the body members of the block assemblies disposed in the grooves of the deformable member and gripped by the walls thereof to resist separation, the flanges and grooves being substantially shorter than the corresponding dimension of the deformable member with their ends disposed inwardly from said spaced side faces of the deformable member, and the body members of the block assemblies being substantially longer than said flanges and grooves to provide friction surfaces of greater axial extent than said flanges and grooves while permitting radial separation of portions of the pressure face of the deformable member from overlying marginal portions of the block body members beyond the flange ends upon distortion of the deformable member without interference from said flanges of the block assemblies.

22. In a torque transmitting device of the type having generally concentric relatively rotatable members and an inflatable, deformable, rubber annulus disposed between the members and surrounding one of them, a plurality of metal plates spaced about the annulus and individually bonded thereto, and means for removably securing the plates to the other member to fasten the annulus to such other member for facile removal and replacement.

23. In a torque transmitting device of the type having generally concentric relatively rotatable members and an inflatable, deformable rubber annulus disposed between the members, the annulus and one of the members having substantially cylindrical faces disposed one against the other, a plurality of circumferentially spaced, substantially flat, metal plates individually bonded to the annulus and disposed substantially flush with said cylindrical face of the annulus, and means for removably securing the plates to said one rotatable member for facile removal and replacement.

24. In a torque transmitting device of the type having generally concentric relatively rotatable members and an inflatable, deformable, rubber annulus disposed between the members, one of said members forming a circumferentially extending channel opening radially toward the other member, the annulus and the bottom of said channel having substantially cylindrical faces disposed one against the other, a plurality of circumferentially spaced, substantially flat, metal plates individually bonded to the annulus and disposed substantially flush with said cylindrical face of said annulus, and pins secured to the plates and extending into said one member through the cylindrical face thereof.

25. In a torque transmitting device having relatively rotatable inner and outer members and an inflatable rubber annulus disposed between the members for establishing a driving connection therebetween, the outer member forming a circumferentially extending channel opening radially inwardly for receiving the rubber annulus, metal plates secured to the rubber annulus and disposed in spaced relation to one another in a series extending circumferentially about the annulus, and shear resisting elements secured to the metal plates and extending radially outwardly from the rubber annulus into said outer rotatable member to secure the annulus to the latter for facile removal and replacement.

26. In a torque transmitting device of the type that includes relatively rotatable members, one of which is formed with an annular channel directed toward the other member, said channel being defined by a bottom wall and a pair of spaced generally parallel confronting side walls, a resilient deformable rubber annulus disposed in the channel and having an attaching face against the channel bottom wall, said rubber annulus having a pressure face for mounting friction blocks and an annular internal chamber for receiving fluid under pressure to expand the rubber annulus in making a driving connection between the members, and blocks mounted on the pressure face of the rubber annulus for frictional engagement with the other rotatable member, the rubber annulus having side faces disposed in confronting relation to the channel side walls, portions of the faces of the rubber annulus adjacent the attaching face being in neutral contact with the channel walls, other portions of the side faces of the rubber annulus adjacent the pressure face being substantially parallel to and spaced from the channel walls to provide annular clearances along the sides of the rubber element between such annulus and the walls of the channel, said clearances being of greater radial depth than axial thickness and being located in a zone between the radius of the pressure face of the rubber annulus and a radius intermediate the radius of the attaching surface and the radius of the pressure face of the rubber annulus, and said internal chamber being located in a zone wholly between said intermediate radius and the attaching face of the rubber annulus, and the rubber annulus being free in the zone of said clearances to be deformed axially in either direction into contact with a side wall of said channel and arcuate shoulders on the rubber annulus extending around the same adjacent the pressure face theerof, said shoulders engaging the channel side walls and substantially closing said annular clearances to entry of hot foreign particles.

27. A fluid motor for use as one of the relatively rotatable components of a torque transmitting device, said motor comprising a rigid member defining an annular channel having spaced confronting side walls and a substantially cylindrical bottom wall, a resilient deformable annulus disposed in said channel, said annulus having oppositely directed substantially cylindrical pressure and base surfaces, the base surface and the bottom wall of the channel being adjacent one another, said annulus having certain side wall portions located adjacent said base surface and disposed in contacting relation against portions of the side walls of the channel, and said annulus also having other side wall portions disposed in closely spaced, confronting, generally parallel relation to other portions of the side walls of the channel in the provision of relatively narrow clearances between said other side wall portions of the annulus and the channel in a flexing zone located between surfaces generated by the pressure and base surfaces of the annulus, said zone being located adjacent the pressure surface of the annulus and spaced from the bottom wall of the channel by the dimensions of the channel wall contacting portions of the annulus side walls throughout substantially the entire circumferential extent of the annulus, and means providing a chamber located in the space between the bottom wall of the channel and the flexing zone for receiving fluid under pressure to distend the annulus in establishing a driving connection; the said other side wall portions of the annulus being substantially wholly unconfined to permit relative movement of such annulus side wall portions toward and away from the channel side walls upon distension of the annulus and in working of the annulus under normal loads and to permit supporting frictional contact of said other side wall portions of the annulus against the channel side walls under severe loads.

28. A fluid motor for use as one of the relatively rotatable components of a torque transmitting device, said motor comprising a rigid member defining an annular channel having spaced confronting side walls and a substantially cylindrical bottom wall, a resilient deformable annulus disposed in said channel, said annulus having oppositely directed substantially cylindrical pressure and base surfaces, the base surface and the bottom wall of the channel being adjacent one another, said annulus having certain side wall portions located adjacent said base surface and disposed in contacting relation against portions of the side walls of the channel, and said annulus also having other side wall portions disposed in closely spaced, confronting, generally parallel relation to other portions of the side walls of the channel in the provision of relatively narrow clearances between said other side wall portions of the annulus and the channel in a flexing zone located between surfaces generated by the pressure and base surfaces of the annulus, said zone being located adjacent the pressure surface of the annulus and spaced from the bottom wall of the channel by the dimensions of the channel wall contacting portions of the annulus side walls throughout substantially the entire circumferential extent of the annulus, friction block assemblies secured to the annulus and disposed against the pressure surface, and means providing a chamber located in the space between the bottom wall of the channel and the flexing zone for receiving fluid under pressure to distend the annulus in establishing a driving connection, the said other side wall portions of the annulus being substantially wholly unconfined to permit relative movement of such annulus side wall portions toward and away from the channel side walls upon distension of the annulus and in working of the annulus under normal loads and to permit supporting frictional contact of said other side wall portions of the annulus against the channel side walls under severe loads.

HERMAN T. KRAFT.

References Cited in the file of this patent

UNITED STATES PATENTS

| Number | Name | Date |
|---|---|---|
| 2,139,409 | Hunter | Dec. 6, 1938 |
| 2,174,724 | Hunter | Oct. 3, 1939 |
| 2,187,226 | Davis | Jan. 16, 1940 |
| 2,229,922 | Heinze | Jan. 28, 1941 |
| 2,245,791 | Kraft | June 17, 1941 |
| 2,246,979 | Kraft et al. | June 24, 1941 |
| 2,251,443 | Fawick | Aug. 5, 1941 |
| 2,251,444 | Fawick | Aug. 5, 1941 |
| 2,251,445 | Fawick | Aug. 5, 1941 |
| 2,256,431 | Hunter | Sept. 16, 1941 |
| 2,283,325 | Fawick | May 19, 1942 |
| 2,311,113 | Klocke | Feb. 16, 1943 |
| 2,354,174 | Schmitter | July 18, 1944 |
| 2,367,048 | Pentz | Jan. 9, 1945 |
| 2,418,099 | Schmitter et al. | Mar. 25, 1947 |
| 2,434,761 | Fawick | Jan. 20, 1948 |
| 2,434,762 | Fawick | Jan. 20, 1948 |
| 2,499,585 | Hollerith | Mar. 7, 1950 |